US006931303B2

(12) United States Patent
Chang et al.

(10) Patent No.: US 6,931,303 B2
(45) Date of Patent: Aug. 16, 2005

(54) INTEGRATED TRANSPORT SYSTEM

(75) Inventors: Ko-Pin Chang, Tainan (TW); Jui-An Shih, Kaohsiung (TW); Hui-Tang Liu, Yungkang (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 10/677,867

(22) Filed: Oct. 2, 2003

(65) Prior Publication Data

US 2005/0075753 A1 Apr. 7, 2005

(51) Int. Cl.[7] .................................................. G06F 7/00

(52) U.S. Cl. ........................ 700/228; 700/112; 414/940

(58) Field of Search ................................ 700/228, 213, 700/229, 99, 100, 101, 102, 112; 414/935, 940, 805, 806

(56) References Cited

U.S. PATENT DOCUMENTS 5,980,183 A * 11/1999 Fosnight ................ 414/222.01
6,089,811 A * 7/2000 Watanabe et al. ........... 414/269
6,468,021 B1 * 10/2002 Bonora et al. .............. 414/522
6,580,967 B2 * 6/2003 Jevtic et al. ................ 700/228
6,591,961 B2 * 7/2003 Fukushima .............. 198/346.2
6,715,978 B2 * 4/2004 Lin et al. ............... 414/416.05
6,733,243 B2 * 5/2004 Ogata et al. ................ 414/217
6,772,032 B2 * 8/2004 Iwasaki et al. ............. 700/113
6,821,082 B2 * 11/2004 McGowan .................. 414/805

* cited by examiner

*Primary Examiner*—Khoi H. Tran
(74) *Attorney, Agent, or Firm*—Thomas, Kayden, Horstemeyer & Risley

(57) ABSTRACT

A transport system within a fabrication system. The fabrication system contains a plurality of tool bays, each of which has a plurality of processing tools for processing articles. The transport system contains a plurality of intrabay transport subsystems, an interbay transport subsystem, a plurality of stockers, and at least one linking subsystem. Each intrabay transport subsystem is dedicated to transporting articles within a particular tool bay. The interbay transport subsystem, linking the tool bays, transports articles between the tool bays. The stockers, located between the intrabay and interbay transport subsystems, store articles between processing and transfer articles between the intrabay and interbay transport subsystems. The linking subsystem, located between two adjacent intrabay transport subsystems, provides direct transport between the two corresponding tool bays.

8 Claims, 4 Drawing Sheets

INTEGRATED TRANSPORT SYSTEM

BACKGROUND

The present invention relates to a transport system and particularly to a transport system capable of conveying articles in a fabrication system.

FIG. 1 is a schematic view showing a conventional fabrication system layout. A fabrication system 100 capable of fabricating semiconductor wafers comprises tool bays 130A and 130B, stockers 120A and 130B, and a plurality of transport systems 110, 115A, and 115B.

Each tool bay 130A and 130B comprises a plurality of processing tools. These tool bays comprise, in general, a number of processing tools for performing various wafer fabrication functions.

Stockers 120A and 120B serve tool bays 130A and 130B respectively. These stockers store carriers loaded with wafers before and after processing.

Each transport system uses carriers for storing and transporting wafers. Within the fabrication system 100, an interbay transport system 110 transfers carriers from one tool bay to another; intrabay transport systems 115A and 115B transport carriers within tool bays 130A and 130B, respectively.

The interbay transport system 110 provides an uninterrupted high throughput material movement across long distances using an overhead shuttle (OHS). The OHS is a high-speed transport mechanism suitable for long distance cross-bay transport.

The intrabay transport systems 115A and 115B use an overhead hoist transport (OHT) for transport, which is suitable for short distance intrabay transport.

The interbay and intrabay transport systems are physically incompatible. The carriers adapted for use in the interbay transport system cannot be used in the intrabay transport system, or vice versa.

Because of the incompatibility, wafers are transferred between different carriers at the stockers when transported between the interbay and intrabay transport systems.

Taking FIG. 1 as a reference, a plurality of semiconductor wafers are scheduled to transport from a processing tool 101 in the tool bay 130A to a processing tool 103 in the tool bay 103B. First, the wafers are loaded into a carrier A through a load port 1101 of the processing tool 101, wherein the carrier A is adapted for use in the intrabay transport system 115A. The carrier A is transported to the stocker 120A through the intrabay transport system 115A. Then the carrier A is handed off from the intrabay transport system to the stocker 120A. The wafers transported are removed from the carrier A and loaded into a carrier I, which is adapted for use in the interbay transport system. The carrier I is transported to the stocker 120B through the interbay transport system 110 and handed off to the stocker 120B. Then the wafers transported are removed from the carrier I and loaded into a carrier B, which is adapted for use in the intrabay transport system 115B. The carrier B is transported to its targeted processing tool 103 through a load port 1031.

Such conventional transport systems have several disadvantages.

First, the conventional transport system is not efficient for short distance cross-bay transport. When wafers are transported between processing tools located in two adjacent tool bays, most of the transport time is spent, not in actual transport, but rather in transfer operations due to the system incompatibility mentioned above.

In addition, the interbay transport system conveys articles in a predetermined direction, for example, clockwise, as shown in FIG. 1 by an arrow D1. Articles must travel nearly completely around interbay transport system 110, when they are transported from the tool bay 130A to the tool bay 130B, even though the bays are adjacently located.

Second, the stockers and interbay transport system become traffic bottlenecks of the conventional transport system. Generally, there is only one crane in a stocker and one or two interbay transport systems in a semiconductor fabrication system. Thus the interbay transport system and stockers may be overloaded and cause traffic congestion in times of heavy traffic.

Third, a malfunction of the interbay transport system has a great impact on the fabrication system. The interbay transport system is the backbone of the transport system and serves as the sole mechanism to convey articles between the tool bays. When the interbay transport system fails, every tool bay is isolated, there is no way to feed wafers to any tool bay or remove wafers from any tool bay other than by manual transfer.

Hence, there is a need for a transport system that addresses the incompatibility problems arising from the existing technology.

SUMMARY

It is therefore an object of the invention to provide a system and method of integrated transport to improve the transport efficiency of fabrication systems. To achieve this and other objects, the present invention provides a system and method capable of conveying articles between processing tools of different tool bays without passing through stockers and interbay transport systems.

According to one embodiment of the invention, a transport system is provided within a fabrication system. The fabrication system comprises a plurality of tool bays, each of which comprises a plurality of processing tools for processing articles.

The transport system comprises a plurality of intrabay transport subsystems, an interbay transport subsystem, a plurality of stockers, and at least one linking subsystem.

Each intrabay transport subsystem is dedicated to transporting articles within each particular tool bay. The interbay transport subsystem, linking the tool bays, transports articles between the tool bays. The stockers, located between the intrabay and interbay transport subsystems, store articles between processing and transfer articles between the intrabay and interbay transport subsystems. The linking subsystem, located between two adjacent intrabay transport subsystems, provides direct transport between the two corresponding tool bays.

According to another embodiment of the invention, a transport method is provided for controlling the transport of articles in the transport system mentioned above. First, the current location of the articles is determined. Second, the transport path is determined in accordance with the status of the articles, the transport system, and the processing tools. Then a transport demand is issued to make the transport system convey the articles to their destination in accordance with the transport path.

The above-mentioned method may take the form of program code embodied in a tangible media. When the program code is loaded into and executed by a machine, the machine becomes an apparatus for practicing the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The present invention will now be described with reference to FIGS. 2 to 4, which in general relate to a transport system within a fabrication system. While the preferred embodiment of the invention operates with semiconductor fabrication systems, it is understood that the type of article processed by the fabrication system is not critical to the present invention, and any fabrication system having transport systems with an interbay/intrabay layout may operate with the present invention. Additionally, it is contemplated that workpieces other than semiconductor wafers may be provided within the carriers used in the present invention, including reticles, flat panels displays, and other substrates which may be stored and/or conveyed within carriers.

Figure 1:
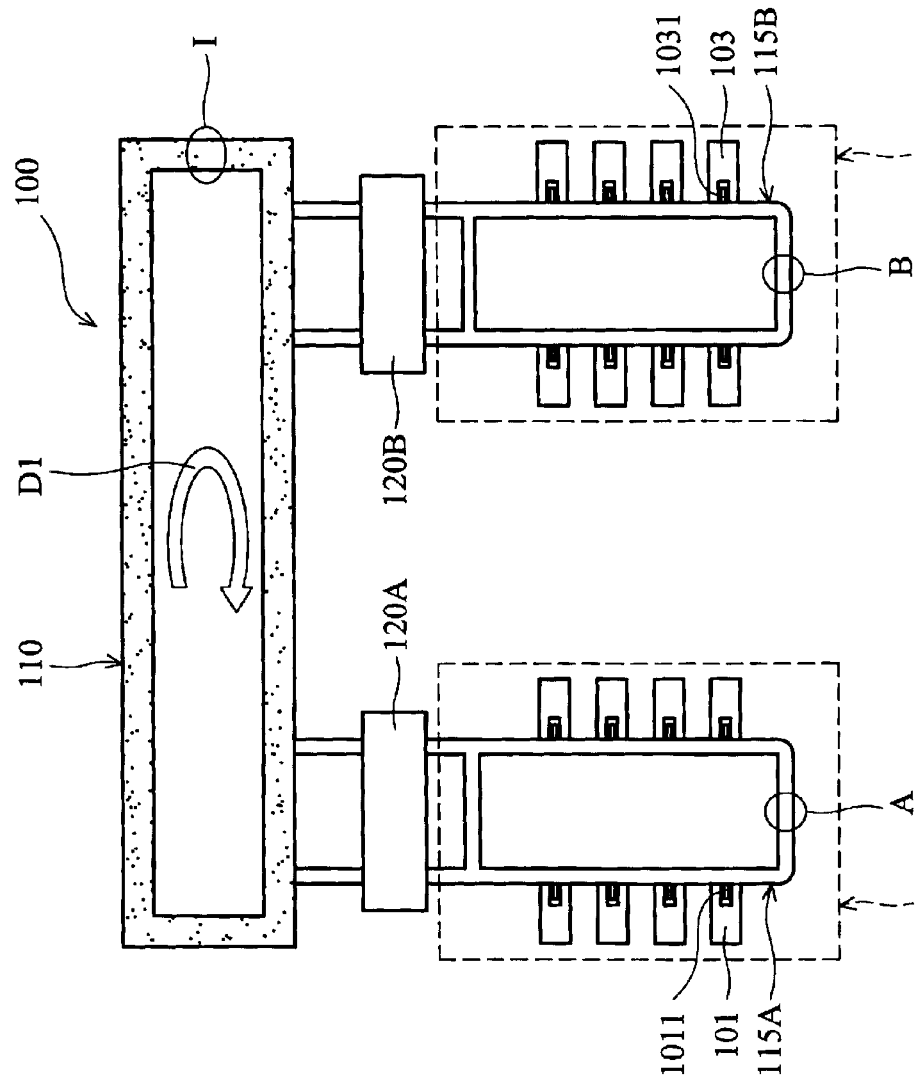
FIG. 1 is a schematic view of a conventional fabrication system layout.
Figure 2:
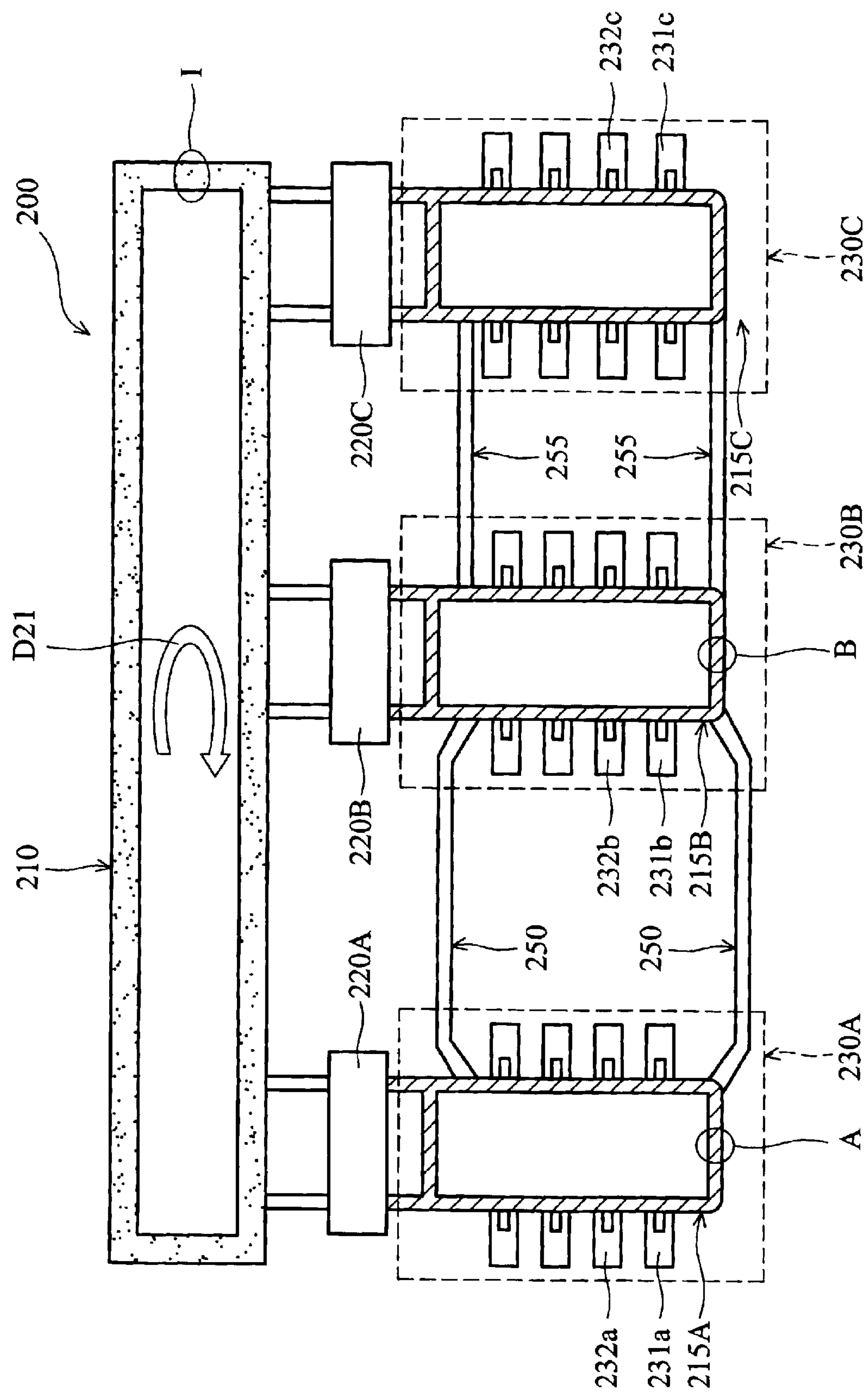
FIG. 2 is a schematic view of an embodiment of a fabrication system layout according to the present invention.

FIG. 2 is a schematic view showing a fabrication system layout according to the present invention. The fabrication system 200 is a semiconductor fabrication system comprising tool bays 230A, 230B, and 230C and a transport system.

Each tool bay comprises a plurality of processing tools. These tool bays comprise, in general, a number of processing tools for performing various wafer fabrication functions. The tool bay 230A, for example, comprises processing tools 231*a* and 232*a*, which are capable of a photolithography function. The tool bay 230B comprises processing tools 231*b* and 232*b*, which are capable of an etching function. The tool bay 230C, for example, comprises processing tools 231*c* and 232*c*, which are capable of an etching function.

As illustrated in FIG. 2, the transport system comprises intrabay transport subsystems 215A, 215B, and 215C, an interbay transport subsystem 210, stockers 220A, 220B, and 220C, and linking subsystems 250 and 255.

The intrabay transport subsystems 215A, 215B, and 215C are dedicated to transporting semiconductor wafers within tool bays 230A, 230B, and 230C, respectively.

As illustrated in FIG. 2, the interbay transport subsystem 210 linking the tool bays transports the articles therebetween. The interbay transport subsystem 210 conveys semiconductor wafers in a predetermined clockwise direction indicated as arrow D21 in FIG. 2.

The stockers, located between the interbay and corresponding intrabay transport subsystems, store semiconductor wafers between processing and transfer semiconductor wafers between the interbay and corresponding intrabay subsystems. Stockers 220A, 220B, and 220C are located between the interbay transport subsystem 210 and intrabay transport subsystems 215A, 215B, and 215C, respectively. Stockers 220A, 220B, and 220C store semiconductor wafers between processing and transfer these semiconductor wafers between the interbay transport subsystem 210 and the intrabay transport subsystems 215A, 215B, and 215C, respectively.

The linking subsystem 250, located between two adjacent intrabay transport subsystems 215A and 215B, provides direct transport between the corresponding tool bays 230A and 230B. The linking subsystem 255, located between two adjacent intrabay transport subsystems 215B and 215C, provides direct transport between the corresponding tool bays 230B and 230C.

When a plurality of semiconductor wafers are scheduled for transport from processing tool 231*a* in tool bay 230A to processing tool 231*b* in tool bay 230B, they are conveyed directly from tool bay 230A to tool bay 230B through linking subsystem 250 without passing through the interbay transport subsystem 210 and stockers 220A and 220B. Additionally, because the intrabay transport subsystem and the linking subsystem are physically compatible, there is no need to transfer these wafers between carriers.

If the processing tool 231*b* fails accidentally, these wafers are transferred to the processing tool 231*c* in tool bay 230C, and are conveyed directly from tool bay 230B to tool bay 230C through linking subsystem 255 without passing through interbay transport subsystem 210 and stockers 220B and 220C.

Figure 3:
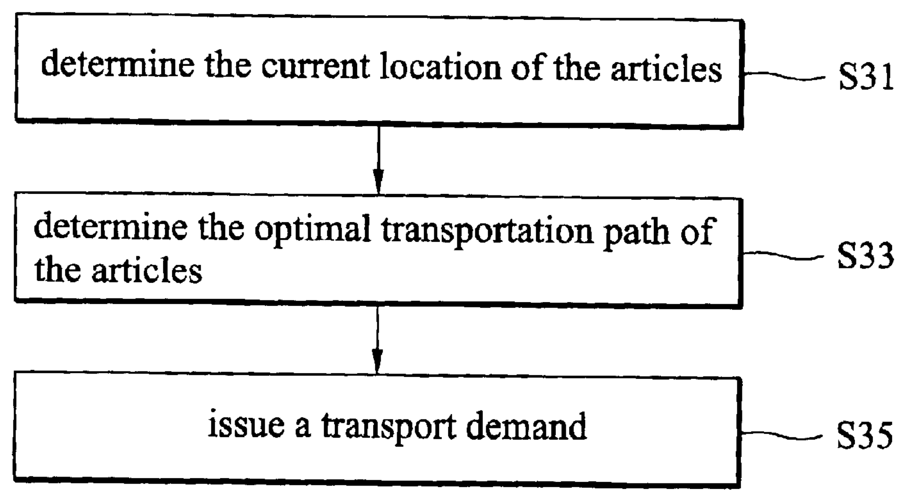
FIG. 3 is a flowchart of the transport operation of the system in FIG. 2.

FIG. 3 is a flowchart showing the transport operation of the present invention. The transport method showed in FIG. 3 controls transport of articles in the transport system described above and shown in FIG. 2.

First, the current location of the semiconductor wafers is determined (step S31). When a semiconductor wafer lot is being processed in the processing tool 231*a* in the tool bay 230A, the current location of the semiconductor wafer lot is the processing tool 231*a*. The next processing station of the processed semiconductor wafers is determined by a real-time dispatch system in the fabrication system in accordance with the location, capability, and work load of different processing tools. The real-time dispatch system selects the processing tool 231*b* as the optimal processing tool for these processed semiconductor wafers.

Second, the transport route is determined in accordance with the status of the articles, the transport system, and the processing tools (step S33). An optimal transport route is determined by an operation job system in the fabrication system in accordance with the number and priority of the semiconductor wafers, the status of the transport system, the location of the optimal processing tool, and various other relevant factors. If the semiconductor wafers to be transported are of high priority and the targeted processing tool 231*b* is waiting for these wafers, these wafers should be transported to the processing tool 231*b* as soon as possible to reduce idle time in processing tool 231*b*.

There are at least two transport path options, through the interbay transport subsystem 210 and through linking subsystem 250.

If the interbay transport subsystem 210 is chosen, then the wafers are transported from the intrabay transport subsystem 215A to the stocker 220A, transferred from the carrier A to the carrier I, conveyed to the stocker 220B, transferred from the carrier I to the carrier B, and transported to the processing tool 231*b*.

If the linking subsystem 250 is chosen, then these wafers are transported directly from intrabay transport subsystems 215A to 215B through linking subsystem 250. Because the intrabay transport subsystems and the linking subsystem are physically compatible, there is no need to transfer wafers between carriers. Thus it is efficient to transport wafers between adjacent tool bays by the linking subsystem.

Next a transport demand is issued to make the transport system convey the articles to their destination in accordance with the transport path (step S35).

The above method is implemented by cooperation of several control systems in a fabrication system, such as the real-time dispatch system, manufacturing execution system, operation job system, material control system, and equipment automation system.

The method of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 4:
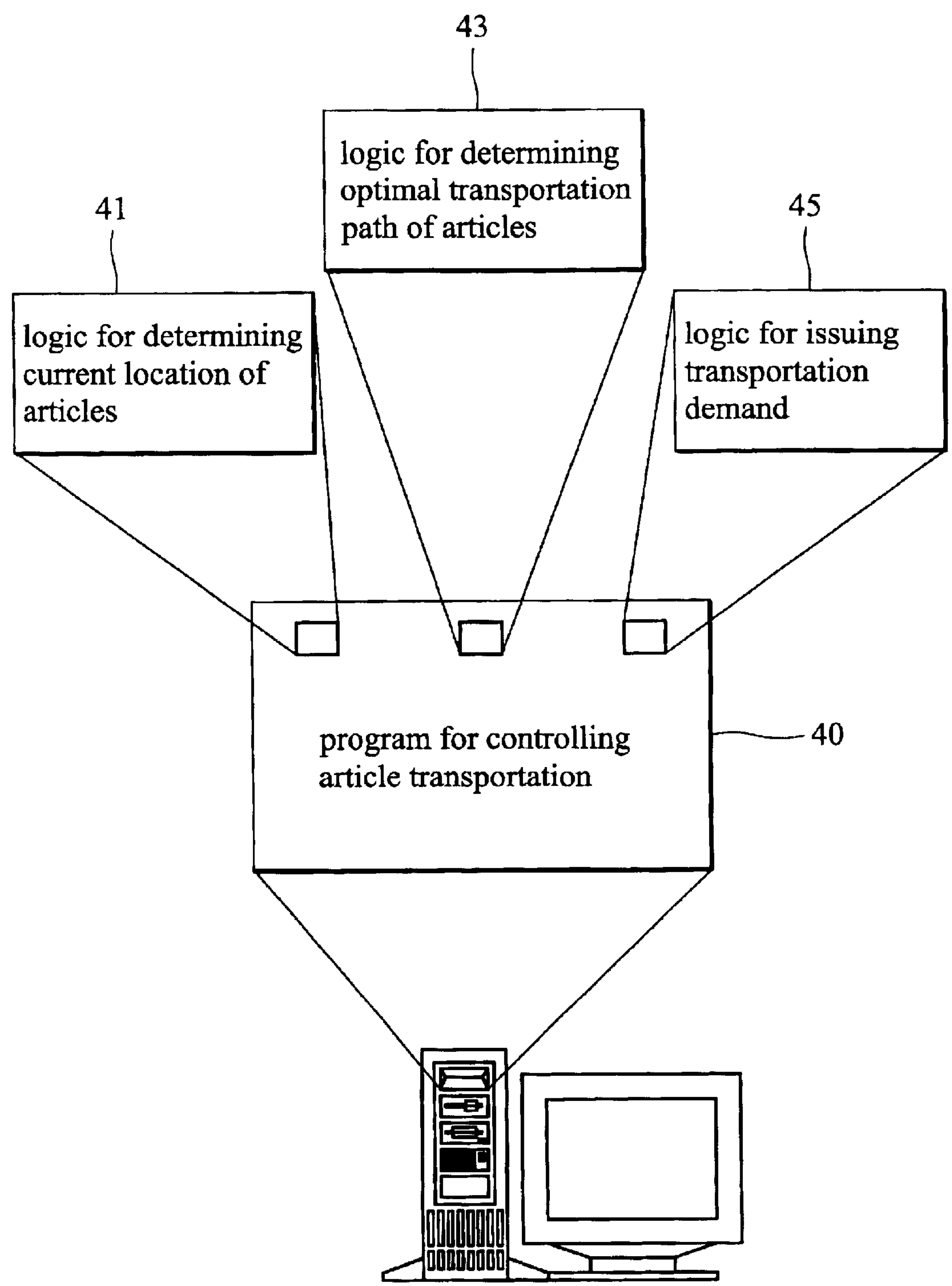
FIG. 4 is a diagram of a storage medium for storing a computer program providing the transport method.

FIG. 4 is a diagram of a storage medium for storing a computer program providing the transport method according to the present invention. The computer program product comprises a computer usable storage medium having computer readable program code means embodied in the medium, the computer readable program code means comprising computer readable program code means 41 for receiving a location data recording the current location of the due articles, a computer readable program code means 43 for determining an optimal transport path for the due articles, and a computer readable program code 45 means for issuing the transport demand.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fabrication system, comprising:

a plurality of tool bays, each of which comprises a plurality of processing tools for processing articles; and a transport system, linking the processing tools for transporting the articles, including:

a plurality of intrabay transport subsystems, each of which is dedicated to transporting articles within one of the tool bays;

at least one interbay transport subsystem linking the tool bays for transporting the articles between the tool bays;

a plurality of stockers located between the intrabay and interbay transport subsystems for storing articles between processing and transferring articles between the intrabay and interbay transport subsystems; and at least one linking subsystem located between two adjacent intrabay transport subsystems for providing direct transport between the two adjacent intrabay transport subsystems.

2. The fabrication system as claimed in claim 1, wherein the articles are semiconductor wafers.

3. The fabrication system as claimed in claim 1, wherein the linking subsystem links tool bays with different fabrication functions.

4. The fabrication system as claimed in claim 1, wherein the linking subsystem links tool bays with the same fabrication function.

5. A transport system within a fabrication system, wherein the fabrication system comprises a plurality of tool bays, each of which comprises a plurality of processing tools for processing articles, the transport system comprising:

a plurality of intrabay transport subsystems, each of which is dedicated to transporting articles within one of the tool bays;

at least one interbay transport subsystem linking the tool bays for transporting articles between the tool bays;

a plurality of stockers located between the intrabay transport subsystem and the interbay transport subsystem for storing articles between processing and transferring articles between the intrabay and interbay transport subsystems; and at least one linking subsystem located between two adjacent intrabay transport subsystems for providing direct transport between the two adjacent intrabay transport subsystems.

6. The transport system as claimed in claim 5, wherein the articles are semiconductor wafers.

7. The transport system as claimed in claim 5, wherein the linking subsystem links tool bays with different fabrication functions.

8. The transport system as claimed in claim 5, wherein the linking subsystem links tool bays with the same fabrication function.

* * * * *